April 18, 1967 M. J. CANTELLA 3,315,168

PULSE DISCRIMINATOR EMPLOYING DELAY-LINES AND THRESHOLD-CIRCUIT FOR SELECTING PULSES OF CERTAIN WIDTHS AND AMPLITUDES

Filed Sept. 30, 1965 6 Sheets-Sheet 1

INVENTOR
MICHAEL J. CANTELLA
BY Claude Funkhouser
ATTORNEY
Robert F. Beers
AGENT April 18, 1967 M. J. CANTELLA 3,315,168
PULSE DISCRIMINATOR EMPLOYING DELAY-LINES AND THRESHOLD-CIRCUIT FOR SELECTING PULSES OF CERTAIN WIDTHS AND AMPLITUDES
Filed Sept. 30, 1965 6 Sheets-Sheet 6

United States Patent Office 3,315,168

Patented Apr. 18, 1967

3,315,168

PULSE DISCRIMINATOR EMPLOYING DELAY-LINES AND THRESHOLD-CIRCUIT FOR SELECTING PULSES OF CERTAIN WIDTHS AND AMPLITUDES

Michael J. Cantella, Burlington, Mass., assignor, by mesne assignments, to the United States of America as represented by the Secretary of the Navy Filed Sept. 30, 1965, Ser. No. 492,364
5 Claims. (Cl. 328—112)

This invention relates to a discrimination technique and more particularly to an electronic discrimination apparatus to process the electrical output of an infrared raster scanning sensor for detecting the location of a point target in extended cloud backgrounds.

Prior art tracking systems normally perform the desired target background discrimination by the use of mechanical chopping reticules placed in front of a single cell detector. Reticule shape is chosen so that minimum modulation is produced by the extended background and maximum modulation is produced by a point target. Certain limitations are inherent in these tracking systems, since it is necessary for them to analyze the entire field of view simultaneously as all of the energy in the field of view is collected by a single cell. One serious disadvantage in the use of a single cell system is that the cell used must possess sufficient dynamic range to handle the energy from the entire field of view. Another disadvantage of this technique is that simultaneous filtering of all the background within the field of view may produce a residual modulation whose amplitude is high compared to the energy amplitude produced by the point target source. Because of the above discussed disadvantages, the present day single cell trackers are normally limited to a maximum field of view of approximately three degrees. This relatively small field of view limits the trackers ability to acquire the target both initially and after a momentary target loss.

There is a need in many military and commercial applications for recognition techniques that are able to distinguish and display desired radar targets without their being masked by background clutter. One of the most troublesome forms of clutter results from various types of cloud formations. The types of cloud radiance patterns which are the most troublesome are the ones that produce a constant radiation pattern and give high level backgrounds. This type of radiant background will reduce the detectibility of point targets by the radar but generally will not produce a false target signal. Other cloud formations produce cloud radiance crests and these are capable of producing false alarms or false target signals which are detrimental to and cause serious limitations to tracking system performance.

Image sensors of the raster-scanning type can provide superior discrimination capability because each portion of the image can be examined separately and unambiguously. Therefore an image sensor would be capable of being used to overcome the prior art disadvantages by providing a unique discriminator circuitry apparatus that employs time domain processing of video signals from a scanning system for recognition and detection of point response waveforms and rejection of extended background waveforms. This discriminator circuitry takes advantage of the fact that, in general, desired targets such as aircraft are very small with respect to cloud background. Thus, the major difference between the wanted and unwanted waveforms will be that of video pulse width. This causes the desired point response waveform to be relatively narrow, whereas the waveforms from cloud backgrounds will be relatively wide. Under a condition of point source for a target imposed on a cloud background there is a substantial difference between the usual pulse width discrimination requirement. In the instant case, the narrow-width pulse video representing the target must be detected while it is superimposed on relatively high-level and high-gradient level caused by cloud background signals.

The present invention seeks to provide improved radar tracking detection by use of an image sensor that can permit electronic discrimination which is superior to that achieved with single cell sensors. The superiority that is realized by such a device permits each element of the field of view to be examined separately, whereas the single cell chopping reticules analyze the entire field of view simultaneously. This superior discrimination capability of the instant apparatus permits much larger fields of view and allows improved seeker performance. The cloud background which produces the high level video is eliminated by successive delay line taps that are connected to the input of a difference amplifier. Thus, the discriminator minimizes the video background level with a minimum of complexity and permits simultaneous filtering of all the background within the field of view and can produce a relatively large residual modulation which limits single cell trackers to a maximum practical field of view of around three degrees. The use of an image sensor that improves a tracking system's dynamic range and also allows the handling of multiple and extended targets in a radar system which is in a track-while-scan mode of operation.

An object of the present invention is the provision of a discriminator that is compatible with a raster scanning image sensor.

Another object of the present invention is the provision of a discriminator apparatus that allows a point source radar return to be distinguished from a cloud background return.

Another object of the present invention is the provision of a discrimination circuitry apparatus that permits the separation of a video point source from sharp bright cloud edges.

Still another object of the present invention is to provide a tracking system that has an improved dynamic range capability and can handle a multiplicity of targets in a tracking mode of operation.

Still another object of the present invention is the provision of a delay line discriminator circuitry apparatus that can be utilized for both single and two-dimensional discrimination.

A further object of the present invention is the provision of an electronic spatial discriminator that is capable of use with a high resolution image scanning sensor.

Still a further object of the present invention is the provision of a discriminator apparatus that provides for automatic detection of a point source return and rejection of an extended cloud background return.

Still a further object of the present invention is the provision of a discriminator circuitry apparatus that permits separation of a point source from background clutter.

Other objects, advantages and novel features of the present invention will become apparent from the following detailed description of the invention when considered in conjunction with the accompanying drawings wherein.

Figure 4:
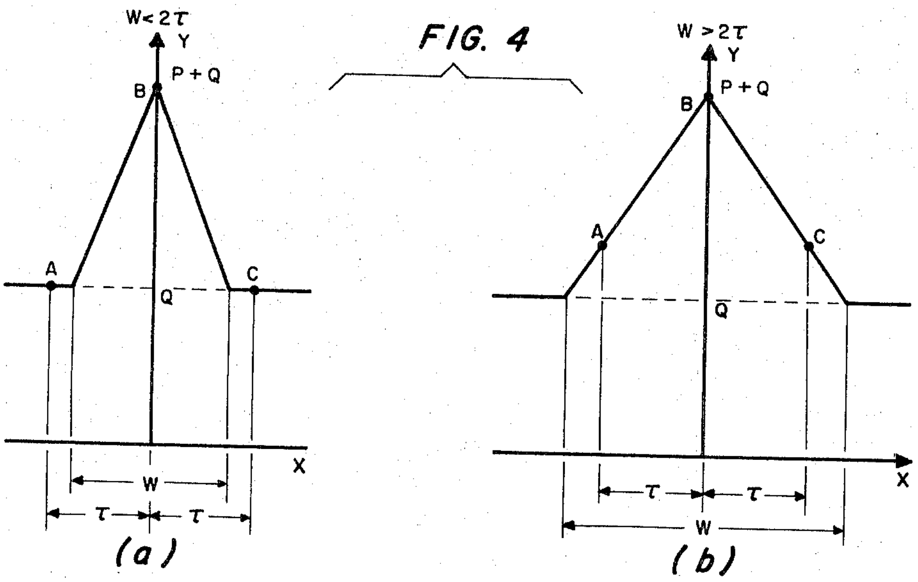
Figure 6:
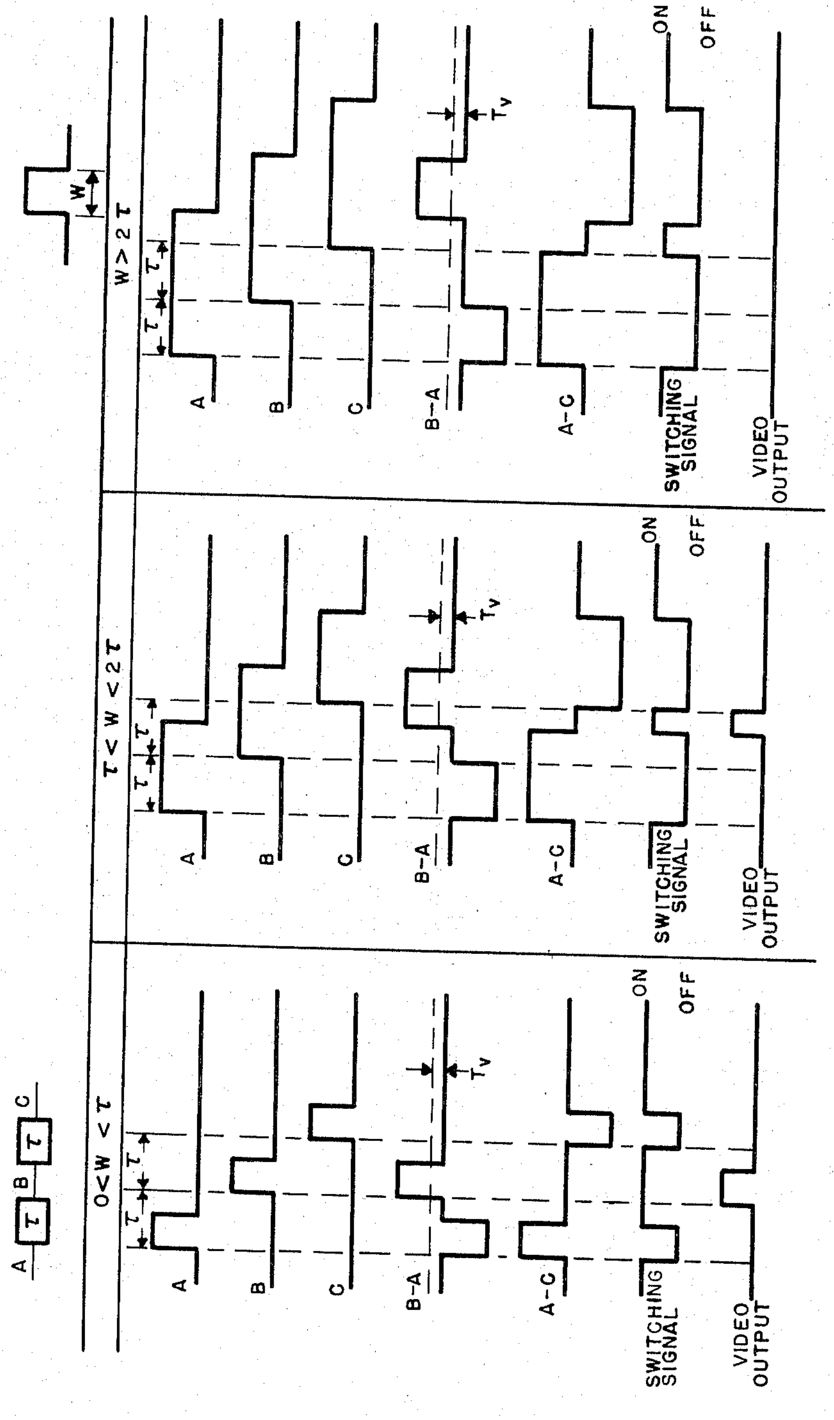

FIGS. 3*a* and *b* illustrate the triangular approximation condition for detection of an isolated video pulse;

FIGS. 4*a* and *b* illustrate the triangular approximation condition for detection of a point target superimposed on a constant-level background;

FIGS. 5*a* and *b* illustrate the triangular condition for detection of a point target superimposed on a constant-gradient background;

FIG. 6 illustrates discriminator pulse-width selection; and

Figure 7A:
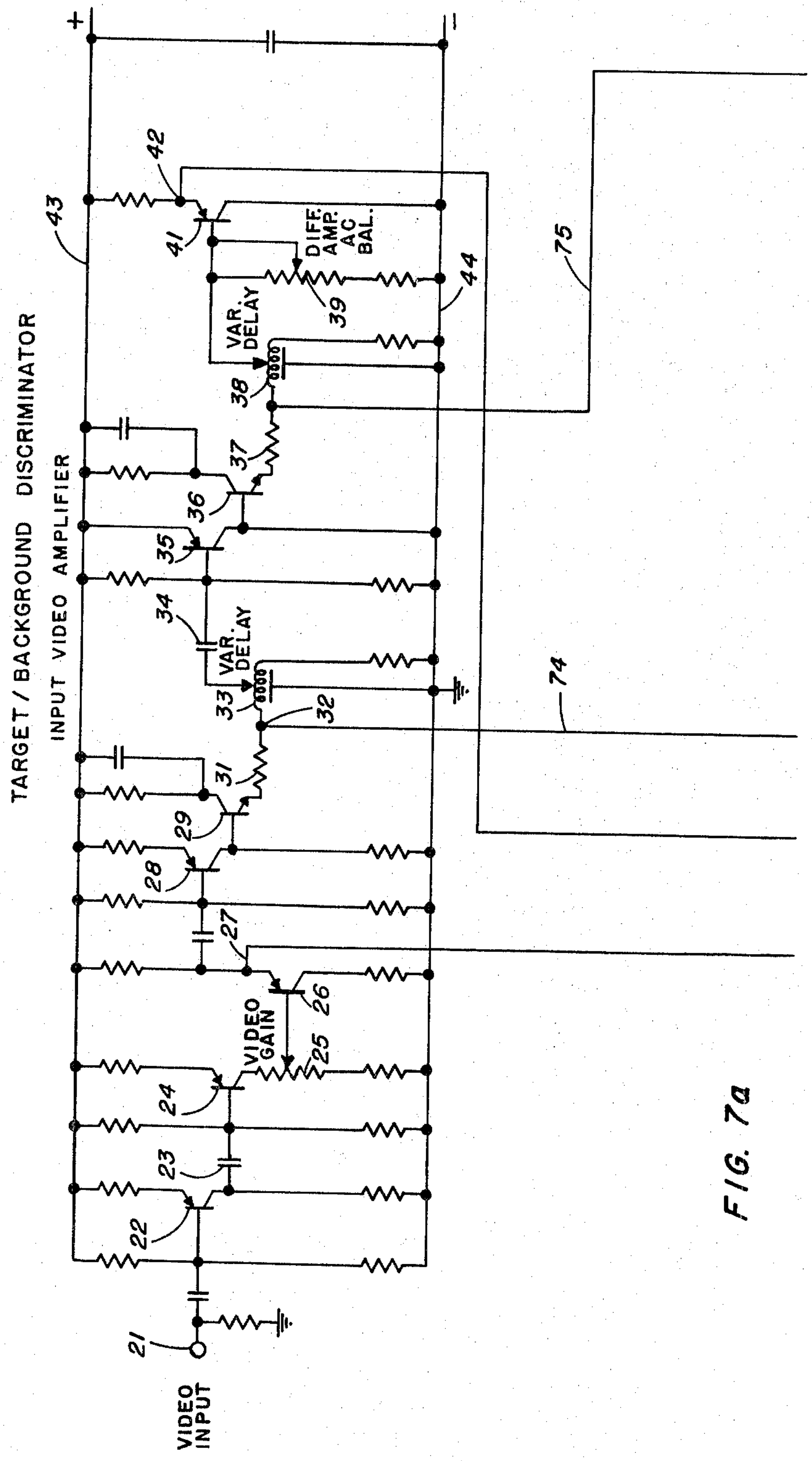
Figure 7B:
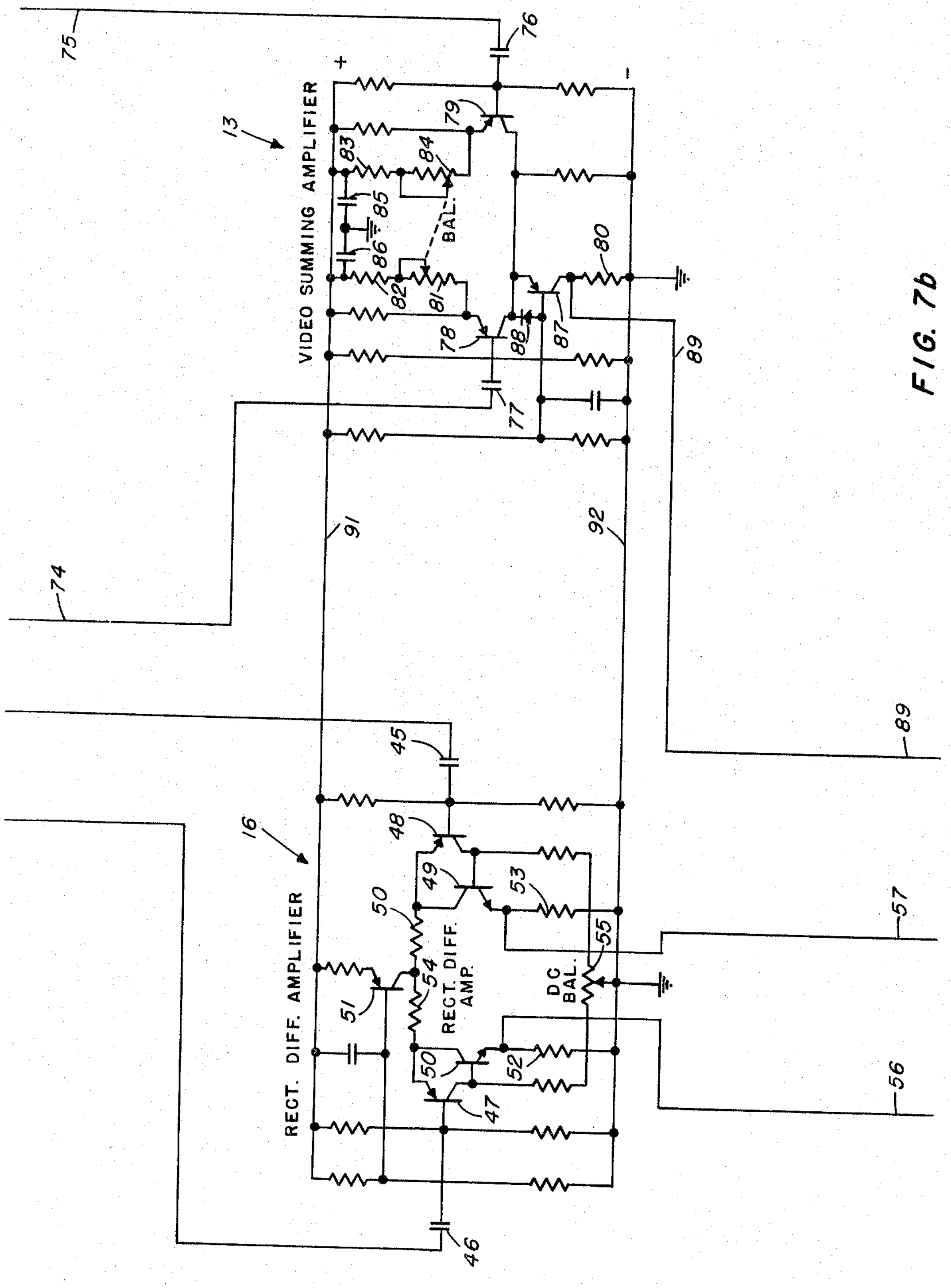
Figure 7C:
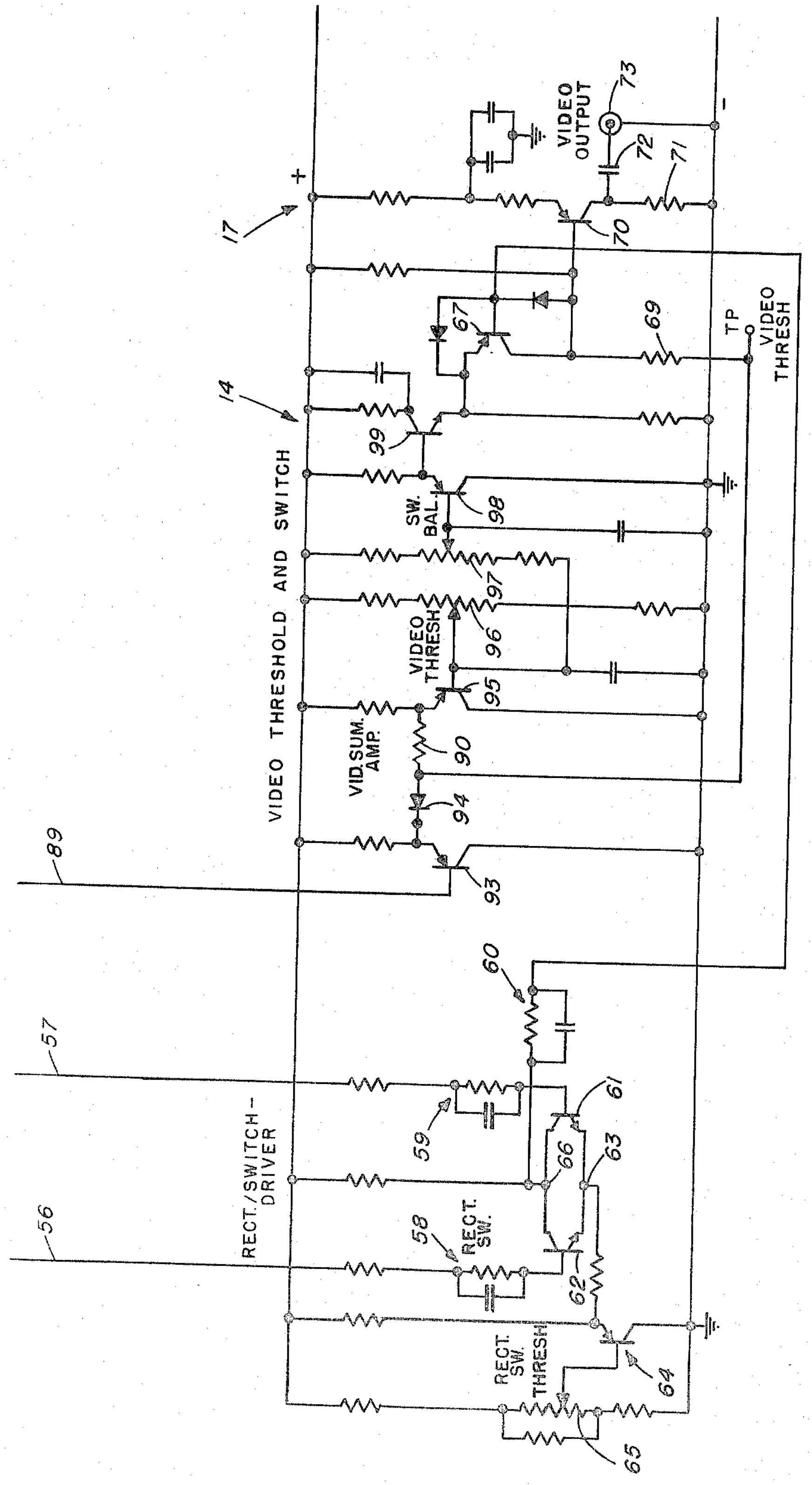

FIGS. 7a–c illustrate a complete schematic diagram of the discriminator circuitry apparatus.

Figure 1:
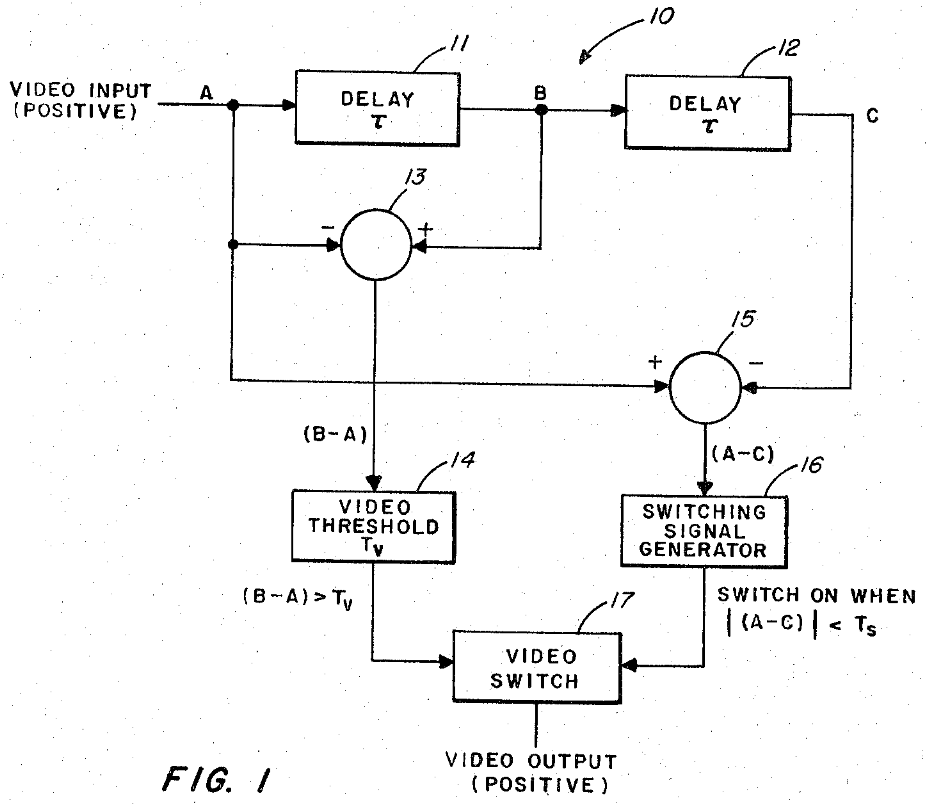
FIG. 1 illustrates a function block diagram of the discriminator apparatus.

Referring now to FIG. 1, there is shown a functional block diagram of the discriminator system. A video input positive waveform (A) from an output circuit of a scanning sensor is fed into a delay circuitry block 11. The output waveform of delay block 11 is coupled to feed the delayed (A) represented as (B) into a second circuitry delay block 12. A summing functional block 13 is paralleled across the delay block 11 to receive both the undelayed and delayed waveforms. Another summing block 15 parallels both delay blocks and receives as inputs the undelayed waveform (A) and the twice delayed waveform (C). The output waveform from summing amplifier 13, which has a waveform output designated as $(B-A)$, is coupled to the input of video threshold functional block 14. The output of the video threshold block 14 couples the signal $(B-A)>T_v$ to a first video switch 17 input. Summing amplifier 15 which has a waveform output proportional to the quantity $(A-C)$ is coupled to switching signal generator functional block 16. The output waveform of this functional block is representative of the quantity $|(A-C)|<T_S$ and a signal representative of this electrical quantity is coupled to the second input of video switch 17. An output taken from video switch 17 represents a positive pulse waveform.

The delay line discriminator of the instant invention employs time domain processing of video from a raster scanning system to permit recognition and detection of point response waveforms and rejection of extended background waveforms. This is accomplished by using a variable delay subsystem and examining the video waveform at several points simultaneously. Appropriate logic is then connected to the delay subsystem to permit detection of only the desired waveshape and provide for rejection of unwanted waveforms. As pointed out above, one of the major differences between the wanted and unwanted waveforms is that of video pulse width. The desired point response waveform is narrow, whereas the waveform from cloud backgrounds is relatively wide. The detection technique described is one which will distinguish a narrow width pulse waveform that is superimposed on relatively high level and high radiant background.

Figure 2:
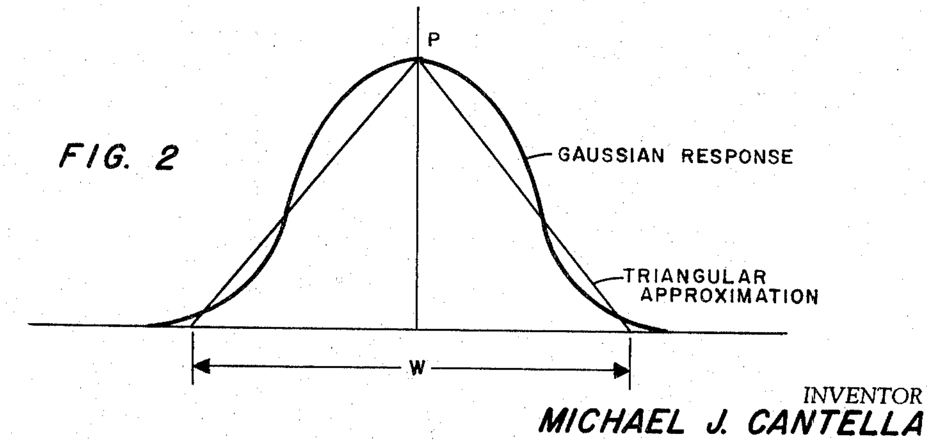
FIG. 2 illustrates the system point response.

Generally, the delay line discriminator shown in FIG. 1 requires matching the discriminator parameters to the point response of the image scanning video system. The point aperture response of the system is approximately Gaussian, as illustrated in FIG. 2. In order to simplify the development of useful mathematical criteria for discriminator performance, the point response is approximated by a triangle and this triangle, as shown in FIG. 2, has an amplitude P and a pulse width W. Triangular approximations are appropriate in this case because the delay line discriminator samples simultaneously three points on the video waveform and makes a decision based on the amplitude at these points. Therefore, mathematical detection criteria have been developed on the basis of triangular approximation of typical waveforms of interest. These include (1) FIG. 3, an isolated video pulse representing a point target or cloud, (2) FIG. 4, a pulse superimposed on a high-level background, and (3) FIG. 5, a pulse superimposed on a constant-gradient background.

Figure 3:
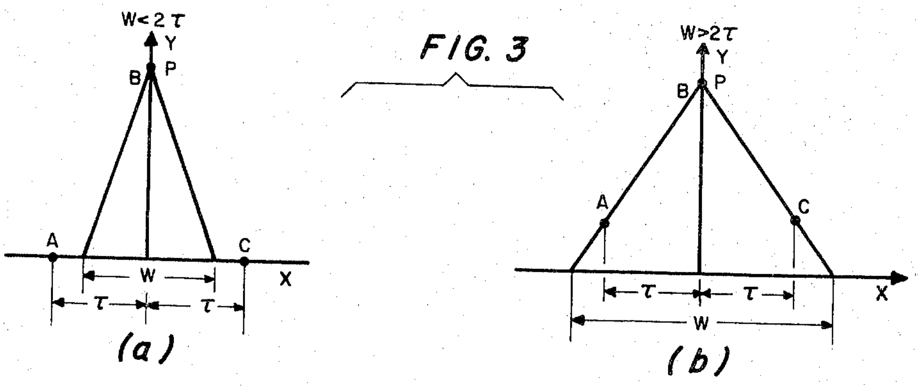

The first situation to be formulated is the detection of an isolated triangular video pulse as illustrated by FIG. 3. This pulse would be representative of a point target or the crest of a cloud radiance pattern. The basic quantities of interest for a triangular approximation are shown in FIGS. 3a and 3d for a time when the conditions are appropriate for a detection.

Let $P$=amplitude of the point-target video pulse, $W$=width of the point-target video pulse (triangular approximation), $T_v$=video threshold.

Detection conditions for $W<2\tau$ with condition I as shown by FIG. 3a having $y_A-y_C=0$ and condition II shown by FIG. 3b having $y_B-y_A>T_V$.

$$P>T_v \text{ or } \frac{P}{T_v}>1 \qquad (1)$$

This indicates that a detection will occur provided the amplitude exceeds the threshold and that the detectability is independent of W.

Detection conditions for $W>2\tau$.

Condition I, $y_A-y_C=0$.

Now $$y_A=\frac{2P}{W}X_A+P\Big|_{-\tau\leq X_A\leq 0}$$

and $$y_C=-\frac{2P}{W}X_C+P\Big|_{0\leq X_C\leq \tau}$$

Therefore $$y_A-y_C=\frac{2P}{W}(X_A+X_C)=0 \qquad (2)$$

but $$X_C=X_A+2\tau$$

Therefore $$X_A=-\tau$$

Condition II, $y_B-y_A>T_v$.

Now $$y_B=P$$

Therefore $$y_B-y_A=-\frac{2P}{W}X_A>T_v$$

Substituting Equation 2 determined from condition I, $$\frac{2P}{W}\tau>T_v$$

or $$\left(\frac{2\tau}{W}\right)\left(\frac{P}{T_v}\right)>1 \qquad (3)$$

Note that this criterion for detection is both amplitude and width dependent. Also note that triangular pulses of width $W>2\tau$ are not necessarily rejected as is the case for a rectangular pulse. The rejection width is amplitude dependent. Since the triangular model is considered a better representation of an actual situation than a rectangular approximation, the above criterion yields some insight into the practical performance which might be realized with regard to cloud background rejection.

It can be said that (1) the transition between point target detection and extended background rejection is neither sharp nor well defined and that (2) difficulty of rejecting this form of extended background signal increases with the ratio of background to threshold amplitude $$\left(\frac{P}{T_v}\right)$$

Another situation is the detectability of a point target superimposed on a cloud background of constant level Q. The combined waveforms are shown in FIG. 4a and FIG. 4b for $W<2\tau$ and $W>2\tau$ at a time when conditions are appropriate for detection.

Detection conditions for $W<2\tau$ with condition I as FIG. 4a having $y_A-y_c=0$ and condition II shown by FIG. 4b as $y_B-y_A>T_v$.

Now $$y_B=P+Q$$

and $$y_A=y_c=Q$$

Therefore conditions I and II are satisfied simultaneously for $$P>T_v \Big|_{W<2\tau}$$

or $$\frac{P}{T_v}>1 \Big|_{W<2\tau} \qquad (4)$$

This criterion is identical to that developed for detection of a point target with no background (Equation 1). Therefore, the discriminator is shown to possess the ability to reject completely background signals of constant level. This capability results from the difference techniques used in the design.

Detection conditions for $W<2\tau$.

Condition I, $y_A-y_C=0$.

Now $$y_A=\frac{2P}{W}X_A+P+Q$$

$$y_C=\frac{-2P}{W}X_C+P+Q$$

So $$y_A-y_C=\frac{2P}{W}(X_A+X_C)=0$$

But $$X_C=X_A+2\tau$$

So $$X_A=-\tau \qquad (5)$$

Condition II, $y_B-y_A>T_v$.

Now $$y_B=P+Q$$

So $$y_B-y_A=\frac{-2P}{W}X_A>T_v$$

Substituting Equation 3 determined from condition I, $$\frac{2P}{W}\tau>T_v$$

or $$\left(\frac{2\tau}{W}\right)\left(\frac{P}{T_v}\right)>1 \qquad (6)$$

This criterion is identical to that determined for an isolated video pulse and again demonstrates the ability of the discriminator to reject completely background signals of constant level.

Figure 5:
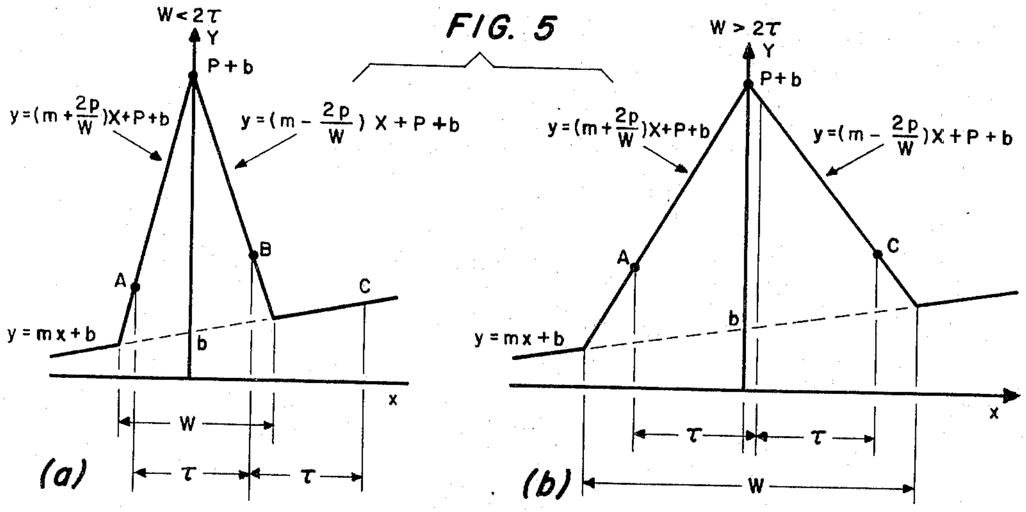

The last problem is the detection of a point target on a background of constant gradient ($m$). FIG. 5 shows the piecewise-linear approximations to the combined waveforms for $W<2\tau$ and $W>2\tau$ at times when conditions are appropriate for detection. The mathematical formulation is based on solution of linear equations over the range of values appropriate to the linear segment in question. Both the video threshold and switching threshold conditions for detection are used to establish bounds on various system parameters. For detection conditions for $W<2\tau$ as shown in FIG. 5a with condition I with $y_A-y_c=0$, then $$m(X_A-X_C)+\frac{2P}{W}X_A+P=0 \Big|_{-\frac{W}{2}\leq X_A\leq 0,\ \frac{W}{2}\leq X_C\leq \infty}$$

but $$X_A-X_C=-2\tau$$

so $$X_A=\frac{W}{2P}(2m\tau-P) \Big|_{-\frac{W}{2}\leq X_A\leq 0} \qquad (7)$$

Using the upper limit for $X_A$ and noting that $$\frac{W}{2P}>0$$

$$(2m\tau-P)\leq 0$$

or $$\frac{P}{2m\tau}\geq 1 \qquad (8)$$

This indicates that to satisfy condition I the amplitude of the point-target pulse should be large. Detectability is degraded for increasing $\tau$ and background gradient $m$. Using the lower limit in Equation 7, $$\frac{W}{2P}(2m\tau-P)\geq -\frac{W}{2}$$

or $$\frac{2m\tau}{P}\geq 0 \qquad (9)$$

These quantities were assumed finite and positive in the formulation of the problem, so the condition is automatically satisfied.

Condition II, $y_B-y_A>T_v$.

$$m(X_B-X_A)-\frac{2P}{W}(X_B+X_A)>T_v$$

but $$X_B-X_A=\tau$$

so $$m\tau-\left(\frac{2P}{W}\right)(2X_A+\tau)>T_v \Big|_{-\frac{W}{2}\leq X_A\leq 0}$$

Substituting Equation 7 determined from condition I, $$m\tau-2(2m\tau-P)-\frac{2P}{W}\tau>T_v \qquad (10)$$

To satisfy condition I, $$2m\tau-P\leq 0$$

Making this substitution and rearranging terms, $$2P\left(1-\frac{\tau}{W}\right)>T_v+3m\tau \Big|_{\frac{\tau}{W}\geq\frac{1}{2}} \qquad (11)$$

This result indicates that within this range ($W\leq 2\tau$) detectability is decreased with increasing background gradient and video threshold. The discriminator delay lines should be set so that $\tau/W$ is as small as possible. (However, note that $\tau/W\geq 1/2$ for this case.)

Detection conditions for $W>2\tau$ (FIG. 5b).

Condition I, $y_A-y_C=0$.

$$m(X_A-X_C)\frac{2P}{W}(X_A+X_C)=0 \Big|_{-\frac{W}{2}\leq X_A\leq 0,\ 0\leq X_C\leq -\frac{W}{2}}$$

but $$X_A-X_C=-2\tau$$

so $$X_A=\frac{W}{2P}\tau\left(m-\frac{2P}{W}\right) \Big|_{-\frac{W}{2}\leq X_A\leq 0} \qquad (12)$$

Using the upper limits and noting that $$\frac{W}{2P}>0$$

and $\tau>0$, $$m-\frac{2P}{W}\leq 0$$

r $$\frac{2P}{mW} \geq 1 \tag{13}$$

:his indicates that to satisfy condition I, the point target .mplitude/width ratio should be large. Detectability ; degraded for increasing background gradient.

Condition II, $y_B - y_A > T_v$.

$$m(X_B - X_A) - \frac{2P}{W}(X_B + X_A) > T_v \Bigg| -\frac{W}{2} \leq X_A \leq 0,$$

$$0 \leq X_B \leq \frac{W}{2}$$

)ut $$X_B - X_A = \tau$$

,o $$m\tau - \frac{2P}{W}(2X_A + \tau) > T_v \Bigg| -\frac{W}{2} \leq X_A \leq 0$$

;ubstituting Equation 12 determined from condition I, $$\tau\left(\frac{2P}{W} - m\right) > T_v \tag{14}$$

Γhis indicates that the slope of the point response wave-:orm must be sufficiently larger than the slope of the background so that the product of this difference and $\tau$ will exceed the video threshold. Detectability is in-:reased for increasing $\tau$ and P and decreasing W and $m$. Note than when $m=0$, the result is identical to that de-:ived for an isolated video pulse of width $W > 2\tau$.

Referring now to FIGS. 7*a* through 7*c* which show a :omplete detailed schematic diagram of the electronic discrimination circuitry, which is illustrated by a func-:ional block diagram (FIG. 1), the video input wave-form from a raster-scanning sensor, not shown, are ca-pacitively coupled from terminal 21 to the base of a video amplifier. The transistor 22 is connected in grounded emitter configuration and has its output capacitively coupled by means of capacitor 23 to the base of a tran-sistor 24 in the second video amplifier circuitry. The video output is taken from the collector and is adjustable by means of a video gain control potentiometer 25. One side of the adjustable arm couples the video signal to the base of ground emitter transistor 26. Two outputs are taken from the emitter side of transistor 26. A lead 27 is capacitively coupled by means of capacitor 46 to the base of transistor 47 positioned in the rectifier and differ-ence amplifier circuitry. The other output connection from the emitter circuitry of transistor 26 is coupled to the base of transistor 28. Transistor 29 is directly coupled by means of its base to transistor 28. Tran-sistor 29 is shown as a PNP transistor and has its emitter series coupled to ground via resistor 31, variable delay network 32 and resistor 20. An output is coupled from junction 32, which is between resistor 31 and variable delay 33, and capacitively coupled by means of capacitor 77 to the base of transistor 78 in the video summing amplifier circuitry.

The delayed video output from variable delay network 33 which may be adjusted within certain limits is ca-pacitively coupled to the base of transistor 35 by means of capacitor 34. An output is taken from the collector of transistor 35 by directly coupling the base of transistor 36 to it. The emitter circuitry of transistor 36 is coupled to ground potential by means of a series network consisting of resistor 37, delay network 38 and resistor 30. An output representative of waveform (B) as illus-trated in FIG. 6 is taken from junction 40 which is be-tween resistor 37 and variable delay network 38 and is coupled by means of lead 75 and capacitor 76 to the base of transistor 79 which is in the video summing amplifier network.

An adjustable arm on the variable delay network 38 permits an adjusted delay signal to be provided in the video waveform which is coupled to the base of tran-sistor 41. Also included in the base circuitry of tran-sistor 41 is an adjustable resistor network to ground which permits difference amplifier A.C. balance. An elec-trical waveform output is taken from junction 42 in the emitter circuitry of transistor 41 which is representative of waveform (C) and this waveform is capacitively coupled to transistor 48 by means of coupling capacitor 45. Transistor 48 is in the rectifier differential ampli-fier subsystem circuitry.

The appropriate D.C. voltage is connected across lines 43 and 44 respectively with the positive potential con-nected to line 43 and the negative potential connected to line 44.

Now referring to FIG. 7*b* which shows a detailed illustration of the video summing amplifier circuitry, it can be seen that the two waveforms (A) and (B), re-spectively, are coupled to the input of transistors 78 and 79, respectively. The emitter circuitry of both tran-sistors 78 and 79 are connected to ground potential via a balancing network comprising adjustable resistors 81 and 84 and series connected resistors 82 and 83 and ca-pacitors 85 and 86. The collector of transistor 78 and transistor 79 are coupled together and a transistor 87 has its emitter coupled to these collectors. A diode 88 is coupled from the collector to the base of transistor 87. The video output is taken across a collector resistor 80 of transistor 87 and is coupled by means of lead 89 to the base of transistor 93. This output is representative of the $(B-A)$ waveform shown in FIG. 6.

Transistor 93 is a video summing amplifier stage which is in the video threshold and switch circuitry. The output from transistor 93 is coupled from its emitter circuitry to the emitter of transistor 95 via a resistor 90 and diode 94. This transistor 95 has electrically coupled in its base circuitry an adjustable resistance 96 which permits adjust-ment of the video threshold level. Also electrically cou-pled to the base of transistor 95 is one side of a potentiom-eter 97 which has its adjustable arm connected to the base of transistor 98. This adjustment provides video switch balancing. Transistor 99 is directly coupled by means of its base to the emitter of transistor 98; and is further coupled to transistor 67 by means of its emitter. The base of transistor 67 is coupled to receive an output from the rectifier switch driver circuitry. This circuitry will be further explained below. The output of transistor 67 is coupled to the base of transistor video amplifier 70. This output is taken from across resistor 69. The video output taken from terminal 73 is taken across the col-lector resistor 71 of transistor 70 and is capacitively cou-pled to this terminal by means of coupling capacitor 72.

Referring now to FIG. 7*b* and more specifically with reference to the illustration of the rectifier difference am-plifier circuitry, where there is shown the two waveforms (A) and (C) coupled to the base of transistors 47 and 48, respectively. The two emitter sides of transistors 47 and 48 are coupled together via resistors 40 and 50. A transistor 51 is coupled by means of its base to the junc-tion of these two resistors. A NPN transistor is parallel coupled across the collector and emitter terminals of transistor 47 by connection of its collector to the emitter of transistor 47 and the connection of its base to the col-lector of transistor 47. The emitter of transistor 49 is coupled to ground potential by means of emitter resistor 52. A D.C. balancing network consisting of a potentiom-eter 55 and series coupled resistors (not numbered) is coupled to the base of transistor 50. The output taken from across resistor 52 is electrically coupled by means of lead 56 to the base of transistor 62 via a resistance capacitive network 58. Transistor 62 forms a part of the rectifier and switch driver circuitry. Transistor 48 is paralleled by means of transistor 49, by having the base of transistor 49 coupled to the emitter of transistor 48 and the base of transistor 49 coupled to the collector of transistor 48. The emitter of transistor 49 is coupled through a resistance 53 to ground potential. A D.C. balancing network comprising variable resistance 55 and a series resistor (not numbered) is electrically coupled to the base of transistor 49. A signal output is taken from across resistor 53 and coupled by means of electrical lead 57 to the base of transistor 61 in the rectifier and switch driver network via a resistive capacitive network 59.

Referring now to FIG. 7*c* and in particular to the illustration of the circuitry of the rectifier switch driver, this circuitry has two inputs coupled to transistors 61 and 62, respectively, both transistors 61 and 62 are PNP transistors and are coupled in parallel by means of their respective collectors and emitters. Coupled in the emitter circuitry at junction 63 is a transistor 64 which has its emitter coupled to a potentiometer 65 which permits rectifier switch current input adjustment. This transistor and potentiometer 65 provides the rectifier switch threshold adjustment. An electrical output is taken from junction 66, the common connection of the two collectors of transistors 61 and 62 and is coupled to the base of transistor 67 via resistive capacitive network 60.

The following general description of the operation of the target background discriminator is explained with reference to FIGS. 6 and 7*a* through 7*c*. An electrically video signal input, such as that representative of waveform (A), in FIG. 6, is electrically connected to terminal 21 and amplified through two transistorized stages having transistors 22 and 24, respectively. A third video stage, transistor 26, is provided with a gain control 25 in its input circuit to allow variation of current input. These three transistorized input video amplifier stages provide the necessary gain and power to drive the variable delay lines 33 and 38, respectively. The prime function of the video gain stage 26 is to permit the input signals above and below a predetermined amplitude to drive the system so as to obtain maximum linear response. An electrical output is taken from junction 27 and this output is representative of the waveform (A) shown in FIG. 6. One of these outputs is electrically connected to one of the inputs to the rectifier difference amplifier while the other is fed through two additional transistorized stages to a first variable delay network 33. The delayed pulse from this network is capacitively coupled by means of capacitor 34 to two additional transistorized stages 35 and 36, respectively. An electrical output waveform such as that represented by (B) waveform in FIG. 6 is electrically coupled to the base of transistor 79 in the video summing amplifier circuitry. This output is taken from the emitter circuitry of transistor 36 at junction 40. A further delay is added to the waveform (B) by variable delay network 38 and the output is coupled directly to video amplifier stage 41; this stage also having a means for providing A.C. balance for the difference amplifier circuitry. This function is accomplished by adjustment of variable resistance 39 in the base circuitry of transistor 41. The delayed and amplified pulse waveform representative of (C) waveform in FIG. 6 is electrically coupled from the emitter of transistor 41 at junction 42 to the rectifier difference amplifier circuitry.

The difference amplifier circuitry is used to process two inputs from junctions 26 and 42; the undelayed waveform (A) and the twice delayed waveform (C). Each input to the difference amplifier uses an NPN, PNP combination of two transistors 47, 50 and 48, 49, respectively, to provide a high loop gain. This high loop gain yields high D.C. stability, wide band width, and good linearity in the difference mode operation. The additional transistor 51 represents a transistor current source and is connected in the common collector circuit to provide rejection of the common mode input signal and it also provides for additional D.C. stabilization of the common mode output level.

A D.C. balance control 55 is provided to permit maximum balance adjustment in the rectifier difference amplifier circuit. Although not shown, A.C. balance may be accomplished by variation of the gain in one of the input circuits, and this may be accomplished by adjustment of the differential amplifier A.C. balance variable resistor 39 to change the A.C. input to transistor 48.

The two outputs from the rectifier differential amplifier circuitry are electrically coupled via electrical networks 58 and 59, respectively, to two transistors 61 and 62, respectively. The base to emitter diodes of these two transistors provide full wave rectification of the outputs from the difference amplifier circuitry. As illustrated, the collectors of these two transistors 61 and 62 are connected together and coupled to a positive source of potential via a common load resistor. The switching signal output taken across this load resistor (not numbered) at junction 66 is D.C. coupled through a resistor capacitor network 67 to the base of the video switch transistor 67. The two emitters of transistors 61 and 62 are coupled together to an emitter follower transistor stage 64 and this emitter follower stage provides variable switching threshold level by adjustment of potentiometer 65.

Referring now to FIGS. 6 and 7*a* and 7*b*, once the input signal has been amplified by the video stages it is coupled to one of the inputs of the video summing amplifier circuitry. This signal is representative of the (A) waveform and is taken from junction 32 and is electrically coupled to the base of transistor stage 78 via a coupling capacitor 77 in the video summing amplifier circuitry. Another output from junction 40, which is representative of the (B) waveform, is coupled to the other input of the video summing amplifier via line 75 and coupling capacitor 76. The two input transistor stages 78 and 79, respectively, are operated as common emitter amplifiers and their collector currents are summed. The collector load consists of the parallel combination of a resistor 80 and a common base amplifier stage transistor 87. The common base amplifier stage 87 improves the frequency response and dynamic range of the basic summing amplifier. A single ended output is obtained from across the collector resistor 80 of transistor 87 and this output signal representative of $(B-A)$ is coupled via the electrical lead 89 to the transistor stage 93 in the video threshold and switching circuitry.

The two summing transistorized amplifiers 78 and 79 are provided with an A.C. balance control consisting of adjustable resistors 81 and 84 and resistors 82, 83 and capacitors 85 and 86. This balance control permits attainment of proper common mode rejection in the difference operation.

The waveform $(B-A)$ that is fed to the base of transistor 93, best shown by reference to FIG. 7*c*, is amplified and the output is fed through a diode 94. The diode 94 operates in a low impedance circuit to provide a sharp threshold action and wide bandwidth when operating as the video threshold. This video threshold level is adjustable by adjusting transistor input 95 with potentiometer 96. The output from the threshold is a replica of that portion of the difference signal which exceeds the threshold $(T_v)$ and this signal is coupled via resistor 69 to the collector of transistor 67. The video switching circuitry transistors 67, 99 and 98 are used to gate the output of the threshold circuit and they are driven by the switching signal coupled to the base of transistor 67 from the rectifier switch driver circuitry. The video switch turns the video signal off by shunting the signal from the video threshold circuitry transistor 95 thus allowing the video switching circuitry to open only when the magnitude of the difference signal $(A-C)$ exceeds the switching threshold $(T_v)$. At all other times, including the condition of zero input signal, the switching circuitry is normally closed. The rectifier switch driver circuitry has the ability to reject wide positive pulses whose width is greater than W, greater than $2\tau$ and all negative pulses. The video ignal taken from the switch circuitry is taken across :ollector resistor 69 of transistor 67, is amplified and in-'erted by transistor 70, and is capacitively coupled to he video output cable termination 73.

In summary, it is now readily apparent that the dis-:riminator system of the instant disclosure is basically ι pulse width discriminator which has the capability of ;electing positive pulses which are greater than a selectable ninimum amplitude and narrower than a selectable width :ven if these pulses are superimposed on high level back-ground signals. The video threshold circuitry passes dif-:erence signals which are above the positive threshold ;etting. The switching signal will turn the video switch on when the amplitude of waveforms (A) and (C) are approximately equal. This condition corresponds to the possibility of a narrow positive or negative pulse stored in the delay line memory. A video output is obtained only when both sets of the above conditions are satisfied simultaneously.

Obviously many modifications and variations of the present invention are possible in the light of the above teachings. It is therefore to be understood that within the scope of the appended claims the invention may be practiced otherwise than as specifically described.

What is claimed is:

1. An electronic discriminator circuitry apparatus for processing the electrical output of an infrared raster scanning sensor to distinguish the location of a point target video return in an extended cloud formation comprising first delay means coupled to said video signal input means for providing a predetermined delay to the video signal, second delay means coupled to electrically receive the output of said first delay means for further providing additional predetermined delay to the video signal, first adder means having two input circuits, said inputs electrically coupled so as to place said adder in parallel circuitry arrangement with said first delay means, second adder means having two input circuits, said input circuits electrically coupled to place said second adder means in parallel circuitry arrangement with said first and second delay means, video threshold means electrically coupled to receive the output of said first adder for providing an output voltage when the difference signal is greater than a predetermined threshold value, switching signal generator means electrically coupled to receive the output from said second adder for providing an output voltage when the difference signal is less than a predetermined value, and video switch means electrically coupled to receive the output voltage from said video threshold means and said switching signal generator means for turning the video switch to deliver a positive pulse output only when a difference signal is above the threshold value and the amplitude of the two voltage inputs to said second adder are approximately equal.

2. The combination of claim 1 wherein said second added means comprises a transistorized rectifier difference amplifier circuitry having two outputs.

3. The combination of claim 1 wherein said switching generator means comprises a transistorized rectifier threshold circuitry.

4. An electronic discriminator circuitry apparatus for processing the electrical output of an infrared raster scanning sensor to distinguish the location of a point target video return in an extended cloud formation comprising first delay means coupled to said video signal input means for providing a predetermined delay to the video signal, second delay means coupled to electrically receive the output of said first delay means for further providing additional predetermined delay to the video signal, first adder means having two input circuits, said inputs electrically coupled so as to place said adder in parallel circuitry arrangement with said first delay means, a difference amplifier means having two input circuits, said input circuits electrically coupled to place said second added means in parallel circuitry arrangement with said first and second delay means, rectifier threshold means electrically coupled to receive the output of said difference amplifier for providing an output voltage when the difference signal is greater than a predetermined threshold value, video threshold means electrically coupled to receive the output from said first adder for providing an output voltage when the difference signal is less than a predetermined value, and video switch means electrically coupled to receive the output voltage from said video threshold means and said rectifier threshold means for turning the video switch to deliver a positive pulse output only when a difference signal is above the threshold value and the amplitude of the two voltage inputs to said second adder are approximately equal.

5. An electronic circuitry apparatus for processing the electrical output of an infrared raster scanning sensor to distinguish the location of a point target video return in an extended cloud formation comprising first video amplifier means for providing amplification and level adjustment of the video input signal, first delay means electrically coupled to receive the output from said video amplifier means for inserting a predetermined delay to the video signal, second delay means electrically coupled to receive the output from said first delay means for inserting a further predetermined delay in the video signal, video summing amplifier means having first and second inputs, said first input electrically coupled to the input of said first delay means and said second input electrically coupled to the input of said second delay means, video threshold means electrically coupled to receive the output from said video summing amplifier means, rectifier difference amplifier means having first and second inputs, said first input electrically coupled to receive the output signal from said first video amplifier means and said second input coupled to receive the output of said second delay means, rectifier threshold means coupled to electrically receive the output from said rectifier difference amplifier means, said rectifier threshold means having an output whenever the difference signal exceeds a predetermined level, and video switch means electrically coupled to receive the outputs from said video summing amplifier and said rectifier difference amplifier for processing to deliver a positive video output signal whenever the output from the video summing amplifier is above the threshold value of the video threshold means and the amplitude of the inputs to the rectifier difference amplifier means are approximately equal.

References Cited by the Examiner

UNITED STATES PATENTS

| | | | |
|---|---|---|---|
| 2,841,710 | 7/1958 | Marschall | 328—112 |
| 2,951,988 | 9/1960 | Harlan et al. | 328—112 |
| 3,122,647 | 2/1964 | Huey | 307—88.5 |

DAVID J. GALVIN, *Primary Examiner.*

J. HEYMAN, *Assistant Examiner.*